Aug. 22, 1950     D. J. JORDAN     2,519,968

FUEL SYSTEM

Filed Feb. 8, 1946

INVENTOR.
Donald J. Jordan
BY M. B. Tasker
ATTORNEY

Patented Aug. 22, 1950

2,519,968

UNITED STATES PATENT OFFICE 2,519,968

FUEL SYSTEM

Donald J. Jordan, Milford, Conn., assignor to United Aircraft Corporation, East Hartford, Conn., a corporation of Delaware Application February 8, 1946, Serial No. 646,416

6 Claims. (Cl. 158—36.3)

This invention relates to fuel systems and particularly to an improved fuel system for aircraft.

The pilot of an aircraft has many duties to perform in flight. This is particularly true in the case of a fighter pilot who has the sole responsibility for the operation of a highly complicated airplane. Among other things, the pilot has had to watch the gauges of several fuel tanks which are located at various places in the plane, wherever space is available, and manually select the tank from which the engine is to be supplied, remembering to select another tank when the tank being used is emptied. Obviously, failure to open a fuel supply valve might easily result in disaster if the fuel supply should fail in combat.

The fuel tanks are frequently of widely different capacities, especially in fighter craft in which every available space is utilized to increase the fuel capacity of the aircraft. If the tanks are emptied one at a time by manual manipulation of the valves, the center of gravity of the airplane is seriously affected as the tanks are not only of different capacities but are located at different distances from the center of gravity of the airplane. This entails further worry to the pilot who has to switch his fuel supply frequently from one tank to another in an attempt to maintain the balance of the aircraft.

It is an object of this invention to provide a simple and effective fuel system for automatically feeding fuel to the engine from a plurality of fuel tanks approximately in proportion to the respective capacities of the tanks in such manner that all of the tanks will normally be emptied at approximately the same time or will be emptied according to a predetermined schedule as dictated by the balance of the airplane.

A further object of the invention is generally to improve the construction and operation of fuel feeding systems for aircraft.

These and other objects and advantages of the invention will be evident from the following detailed description of a preferred embodiment of the invention shown in the accompanying drawing for the purpose of illustrating the invention.

Figure 1:
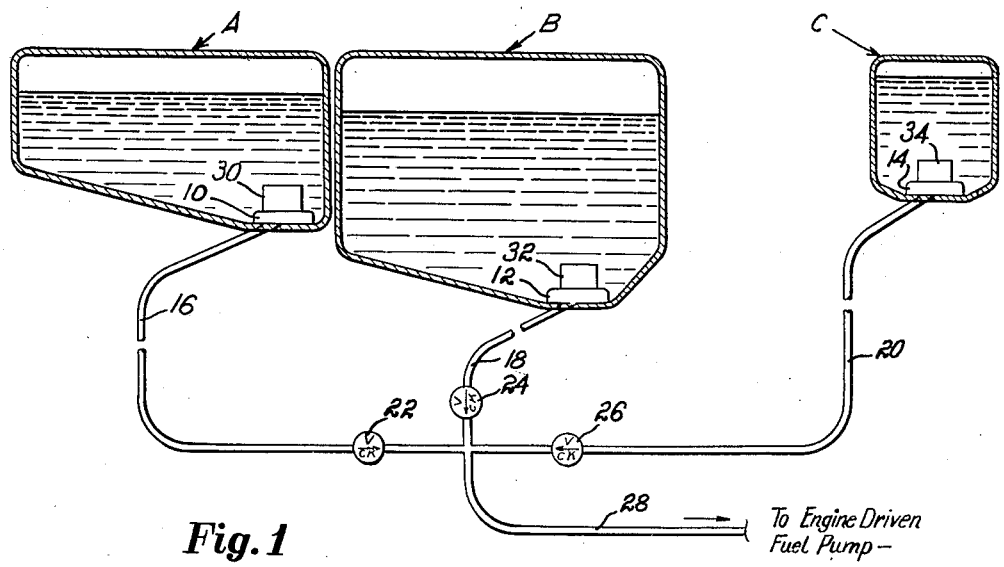
Figure 2:
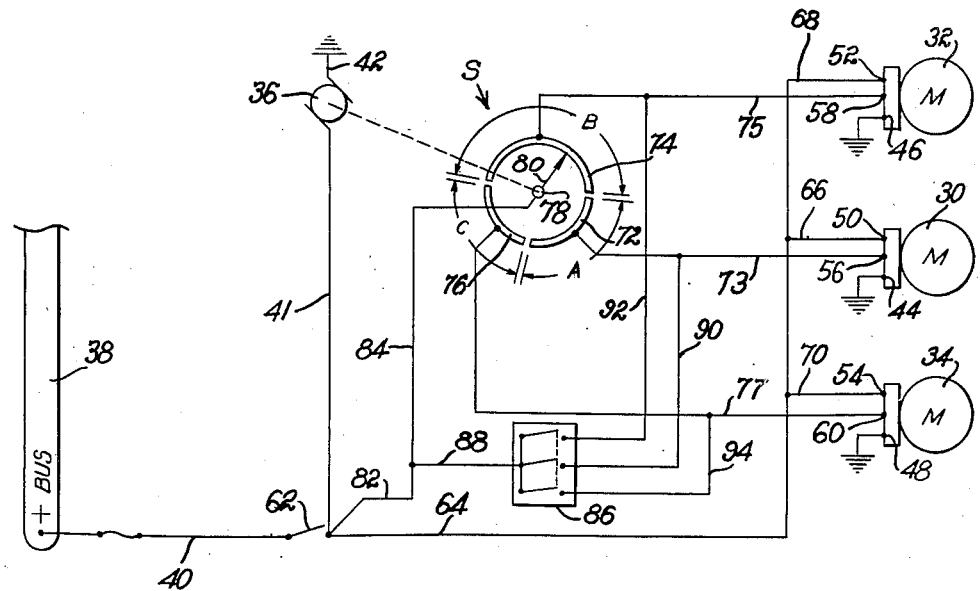

In this drawing,

Fig. 1 is a somewhat schematic view of the fuel tanks of an aircraft and the supply lines leading therefrom to the engine driven fuel pump; and Fig. 2 is a wiring diagram of the electrical control system embodying the invention.

As herein shown, A, B and C are three fuel tanks of an airplane having the usual submerged fuel pumps 10, 12 and 14 which deliver fuel through supply lines 16, 18 and 20 and check valves 22, 24 and 26 respectively to a main fuel supply line 28 leading to the engine driven fuel pump (not shown). The tanks A and B are adapted to be installed in the outboard and inboard portions of the airplane wing, while the tank C may be installed at any available location in the fuselage of the plane, it being understood that like tanks corresponding to A and B may be installed in the opposite wing of the airplane or that any other desired arrangement of the tanks may be made, the invention being adapted for any installation comprising two or more tanks of the same or different capacities. Herein the tanks A, B and C are shown as having widely different capacities in order to illustrate the operation of the electrical tank selector system shown in Fig. 2 for controlling the submerged pumps 10, 12 and 14 by which the fuel is fed from the tanks approximately in proportion to their capacities in such manner that all tanks will be emptied at approximately the same time or according to some other predetermined feeding schedule.

The submerged fuel pumps 10, 12 and 14 have electric motors 30, 32 and 34 respectively which are controlled by a rotary pump selector switch, generally indicated at S, common to the three pumps. The selector switch S is driven at a constant speed by timing motor 36 which is connected in a circuit from a source of power 38 through conductors 40 and 41 and grounded conductor 42.

Motors 30, 32 and 34 for the fuel pumps 10, 12 and 14 are two-speed motors, having ground terminals 44, 46 and 48, low speed terminals 50, 52 and 54, and high speed terminals 56, 58 and 60 respectively. When the manual switch 62 is closed, current is supplied from source 38 through conductor 40 and switch 62 to a conductor 64 which is connected by conductors 66, 68 and 70 to the low speed terminals 50, 52 and 54 respectively. Thus all the pumps are supplied with current so that they operate constantly at low speed which supplies fuel at low pressure to the main engine driven pump from all of the tanks at equal rate.

In accordance with this invention, however, means are provided for emptying the several tanks at different rates approximately in proportion to their capacities. To this end the rotary selector switch S has three stationary arcuate contact strips 72, 74 and 76 which are arranged in circular formation about a center 78, and these contacts are connected by conductors 73, 75 and 77 to the high speed terminals 56, 58 and 60 of the respective pump motors 30, 32 and 34. The lengths of the contact strips 72, 74 and 76 are proportioned in accordance with the desired feeding schedule. Herein, for purposes of illustration, the contact strips have been proportioned to the fuel capacities of their respective tanks. A movable contact member 80, mounted for continuous rotation in the same direction about center 78, bears against the strips in succession, and, since it is driven at a constant speed by timing motor 36, it will remain in contact with the several strips in proportion to their length. The movable contact 80 receives current from source 38 through conductor 40, switch 62 and conductors 82 and 84. Thus the motors 30, 32 and 34 will be driven at high speed to deliver fuel at high pressure at successive intervals to the supply line 28, the intervals being proportional to the amount of fuel contained in the respective tanks.

When fuel is being supplied at high pressure from any one of the tanks, the low pressure supply from the other tanks ceases, although the pumps associated therewith continue to operate at low speed, since the pressure on the discharge side of the check valves is greater than the pressure generated by the two low pressure pumps. Closing of the two check valves associated with the pumps running at low speed acts to prevent fuel from any pump which may be operating at high speed from flowing into the other two tanks.

A manual over-ride switch 86 is provided which receives current from source 38 through conductor 40, switch 62, and conductors 82 and 88 and energizes the high speed terminals 56, 58 and 60 when closed through conductors 90, 73; 92, 75; and 94, 77. This switch is closed only in the case of an emergency.

The operation of the electrical control system will be clear from the above description of its structural parts. It will be evident that all the motors 30, 32 and 34 are constantly energized to operate at low speed whenever the system is put into operation by closing switch 62. The motor 36 which drives the selector switch S is, however, also energized by the closing of switch 62 and causes fuel to be supplied from the several tanks in rotation and at a higher pressure, so that when contact 80 sweeps over the contact strips 74, 72 and 76 fuel is supplied at high pressure first only from tank B by pump 12 for a time determined by the length of its contact 74, after which fuel will cease flowing from tank B and will flow from tank A whose pump motor 30 is next energized for high speed operation. As contact 80 leaves contact 72 and engages contact 76, fuel is supplied at high pressure from tank C. Thus fuel is supplied from each tank in succession for a period of time corresponding to its relative capacity and the cycle is repeated until all the tanks become empty practically simultaneously.

In the event that one tank does empty before the others, due perhaps to its being incompletely filled, or to the intentional establishment of a schedule which allows a certain amount of fuel to remain in one tank after the others have emptied, a continuous supply of fuel will be delivered from the remaining tanks until all the tanks are empty since, whenever the selector switch contact 80 engages the contact strip representing the empty tank, the high speed operation of its pump will create no pressure and the pumps in the other tanks which are running at low speed will continue to pump fuel at low pressure.

It will be evident that as a result of these improvements it has been made possible to provide a simple and effective fuel system for automatically feeding fuel to an engine from a plurality of tanks in such a manner that the tanks will empty according to a predetermined schedule. It will also be evident that as a result of this invention it has been made possible to empty a plurality of tanks of widely different fuel capacity so that all the tanks become empty at substantially the same time.

Further, as a result of this invention the pilot of an airplane has been relieved of all worry attendant the manual selection of his fuel tanks and the necessity for frequent adjustment of the valves in an effort to maintain the trim of his craft; while the danger of running out of fuel due to the improper manipulation of the fuel control valves while fuel still remains in another tank is eliminated.

While only one embodiment of the invention has been shown herein for purposes of illustration, it will be understood that various changes may be made in the construction and arrangement of the parts without departing from the scope of the appended claims, e. g. the contact strips 72, 74 and 76 of switch S may be replaced by a plurality of microswitches which are held closed for varying intervals of time. It will also be understood that the invention is not limited in its application to aircraft.

What it is desired to secure by Letters Patent is:

1. In a fuel system, a plurality of fuel tanks of different capacity, a fuel pump associated with each tank for discharging fuel therefrom at a low pressure, means common to all said pumps for effecting the operation of each of said pumps repeatedly in sequence at a higher pressure, and means for varying the period at which each of said discharging means is operated at said higher pressure.

2. In a fuel system, two fuel tanks of different capacity, each having a fuel pump associated therewith for discharging fuel at a low pressure and at a high pressure, electrical means for actuating both said pumps at said low discharge pressure, and electrical control means common to both pumps for automatically operating them at a higher discharge pressure including a timing device for controlling the operation of said pumps at said higher discharge pressure in sequence for varying periods of time in accordance with a predetermined feeding schedule.

3. In a fuel system, a plurality of fuel tanks of different capacities, each having a fuel discharge line, a fuel pump associated with each tank adapted to be driven at two speeds to provide a low pressure and a high pressure feed, means for normally driving all of said pumps at said low speed, means common to all of said pumps for driving them one at a time in sequence at said higher speed including timing mechanism for restricting the higher speed operation of said pumps to predetermined periods which are in proportion in length to the respective capacities of their associated tanks, and means responsive to the higher pressure developed by any pump when operating at said higher speed for closing the supply lines from said other tanks.

4. In a fuel system, a plurality of tanks of different capacities, an electric fuel pump associated with each tank for discharging fuel therefrom, the motors for said pumps having low speed and high speed terminals, means for constantly energizing said low speed terminals, and means for energizing the high speed terminal of said pumps one after the other in repeated sequence, said energizing means including a timing switch, capable of closing a series of circuits successively, each circuit comprising an elongated contact surface forming a part of said switch which closes its respective circuit for a time interval proportional to the relative capacity of one of said tanks.

5. In a fuel system, a plurality of tanks of different capacities, an electric fuel pump associated with each tank for discharging fuel therefrom, the motors for said pumps having low speed and high speed terminals, means for constantly energizing said low speed terminals, and automatic means for energizing the high speed terminals of said pumps one after the other in repeated sequence, said means including a constantly moving selector switch having a series of contact strips of different length, the length of said strips being proportionate to the capacities of the several tanks to one of which each circuit corresponds.

6. In a plural tank liquid dispensing system, a pump associated with each tank for discharging liquid therefrom, two speed motors for said pumps, means for actuating all of said motors at low speed and means for individually energizing a selected motor at high speed, said last mentioned means including a continually operating timing switch for actuating said motors individually and successively at high speeds each for a predetermined time interval.

DONALD J. JORDAN.

REFERENCES CITED

The following references are of record in the file of this patent:

UNITED STATES PATENTS

| Number | Name | Date |
|---|---|---|
| 1,329,997 | Page | Feb. 3, 1920 |
| 1,335,093 | Copetta | Mar. 30, 1920 |
| 1,412,568 | Mortensen | Apr. 11, 1922 |
| 1,665,060 | Hitchcock | Apr. 3, 1928 |
| 1,776,877 | Yonkese | Sept. 30, 1930 |
| 2,142,062 | Thurman | Dec. 27, 1938 |
| 2,170,136 | Gavin | Aug. 22, 1939 |
| 2,356,200 | Bedard | Aug. 22, 1944 |
| 2,366,654 | Rotter | Jan. 2, 1945 |
| 2,394,431 | Curtis et al. | Feb. 5, 1946 |
| 2,409,245 | Black | Oct. 15, 1946 |

FOREIGN PATENTS

| Number | Country | Date |
|---|---|---|
| 102,732 | Great Britain | Oct. 4, 1917 |
| 503,356 | France | Mar. 16, 1920 |